H. A. BÖHM.
TURBINE POWER PLANT.
APPLICATION FILED JUNE 20, 1914.
1,166,809.
Patented Jan. 4, 1916.
2 SHEETS—SHEET 1.
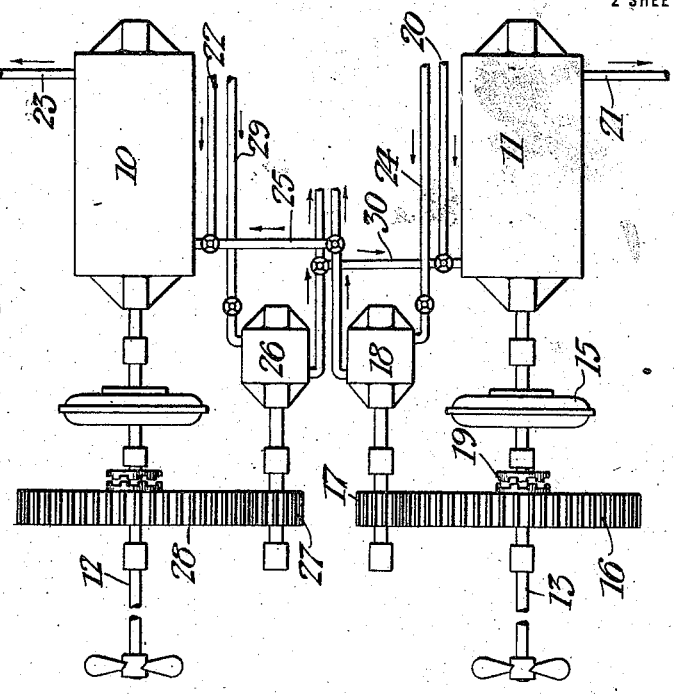
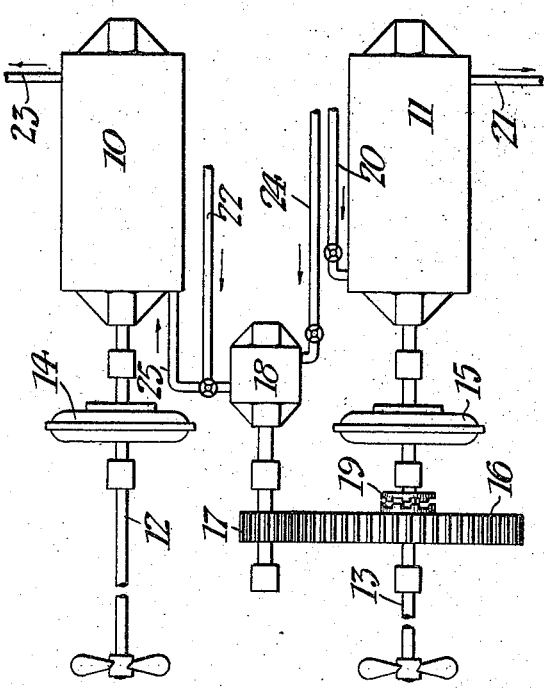
WITNESSES
George McDaniel
Florence Lenei
INVENTOR
Heinrich Adam Böhm
BY
C. W. Fairbank
ATTORNEY

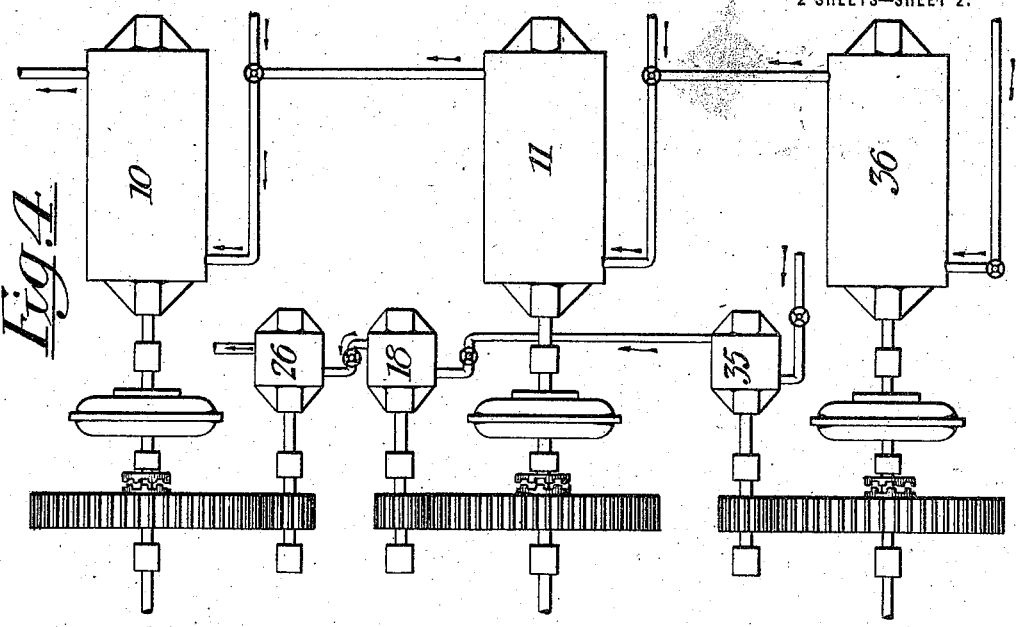
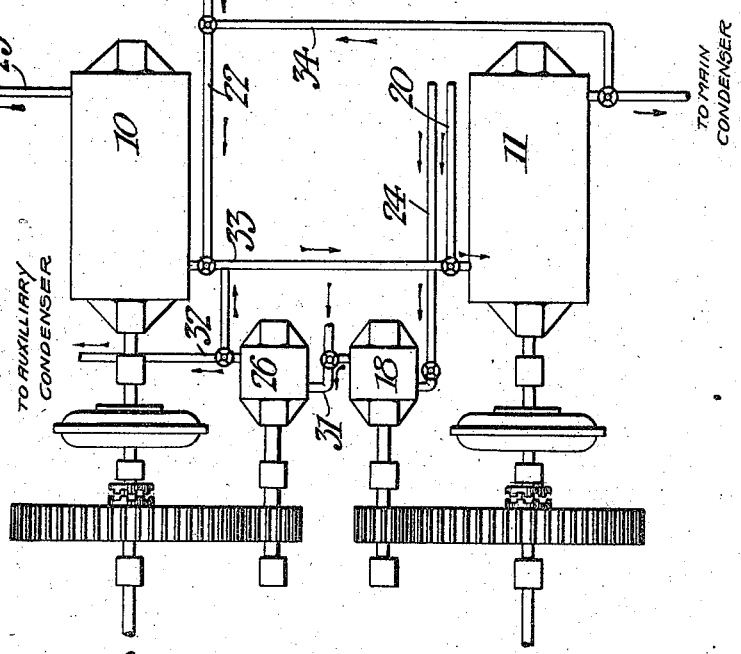

UNITED STATES PATENT OFFICE.

HEINRICH ADAM BÖHM, OF HAMBURG, GERMANY

TURBINE POWER PLANT.

1,166,809.  Specification of Letters Patent.  Patented Jan. 4, 1916.

Application filed June 20, 1914. Serial No. 846,385.

*To all whom it may concern:*

Be it known that I, HEINRICH ADAM BÖHM, a subject of the German Emperor, and resident of Hamburg, Germany, whose post-office address is care of Vulcan-Werke, Hamburg 9, Germany, have invented certain new and useful Improvements in Turbine Power Plants, of which the following is a specification.

This invention relates to certain improvements in turbine power plants, and more particularly to a type designed for use on ships for driving a plurality of separate propellers.

In carrying out my invention, I provide a plurality of turbines and my invention involves the novel and efficient arrangement and combination of these turbines with the propeller shafts or other driven shafts and intermediate gearing, a portion of which is preferably of the Föttinger hydraulic type. I provide a plurality of main turbines preferably one for each propeller and provide one or more cruising turbines which may be operated either in combination with the main turbines or independently thereof, for either slow speed or rearward propulsion as will be more particularly hereinafter pointed out.

Reference is to be had to the accompanying drawings forming part of this specification, and in which similar reference characters indicate corresponding parts in the several views and in which—

Figure 1 is a somewhat diagrammatic plan view of a turbine plant having two main turbines and a cruising turbine associated with one of them. Fig. 2 is a similar view of a turbine plant having two cruising turbines one associated with each of the two main turbines. Fig. 3 is a plan view somewhat similar to that shown in Fig. 2, but with a modified motive fluid circuit, and; Fig. 4 is a plan view of a three propeller plant.

In the specific arrangement illustrated in Fig. 1, I provide two main turbines 10 and 11, and two corresponding propeller shafts 12 and 13, connected thereto by hydraulic power transmitters 14 and 15. I have not illustrated the details of construction of the turbines as any well known form of steam or gas turbine may be employed and I have not illustrated the details of the hydraulic power transmitters as here again various forms may be employed. The transmitters are preferably of the Föttinger type in which separate driving and driven wheels are employed, the power being transmitted from the former to the latter by a fluid receiving kinetic energy from the former and transmitting it to the latter. By withdrawing the liquid from the casing the transmission of power is interrupted, and by suitably varying the flow of the fluid, the driven member may be caused to rotate in the same direction as the driving member, or in the opposite direction.

In connection with one of the main turbines, I employ a cruising turbine 18, having mechanical or electrical gearing for transmitting its power to the shaft of the main turbines. This may be either in front of or behind the power transmitter thereof. As illustrated, the cruising turbine has a pinion 17, and loosely mounted on the shaft of the main turbine 11, is a gear 16 provided with a sliding clutch collar 19 by means of which the gear may be permitted to remain at rest or may be rotated by or from the shaft. The gear 16 is shown between the power transmitter and the propeller. If desired the gear may be rigidly secured to the shaft and thus act somewhat as a fly wheel and the pinion may be connected to this shaft by a clutch, or the pinion may be moved bodily out of the mesh with the gear either by sliding it along a key on its shaft or by bodily swinging the cruising turbine 18.

The turbine 11 is provided with a suitable supply conduit 20 for the steam or other motor fluid and with an exhaust conduit 21 leading to a main condenser not shown. The other turbine 10 may have a similar supply conduit 22 leading from the same main and an exhaust conduit 23 leading to either the same condenser or to a similar one. The cruising turbine has a supply conduit 24, and its exhaust may be sent directly to the main condenser or to a separate condenser, but preferably it goes to the inlet of the main turbine 10.

In using the turbine plant illustrated in Fig. 1, the two main turbines normally receive steam at high pressure and operate at high speed to drive the two propellers through the two hydraulic power transmitters. The steam is preferably delivered to them in parallel, although in some construction, I might make the two turbines of different sizes and deliver the exhaust of one to the inlet of the other. In normal full speed forward driving of the ship, the cruising turbine is disconnected at the clutch 19 or at any suitable point as above indicated and is at rest. The high speed of the turbine is properly reduced to the desired propeller speed by the hydraulic power transmitters. When it is desired to drive the ship at low or cruising speed, the main turbine which is directly associated with the cruising turbine is stopped and disconnected by withdrawing the fluid from its transmitter and the clutch is thrown in to connect the cruising turbine. The valves are turned to drive the other main turbine on the exhaust steam from the cruising turbine. Operating in this manner, the turbine 11 is at rest and power is transmitted from the cruising turbine to the propeller shaft 13 and from the main turbine 10 operating on exhaust steam to the propeller shaft 12.

The arrangement shown in Fig. 2 is very similar to that shown in Fig. 1 except that a second cruising turbine 26 is provided having a pinion 27 adapted to mesh with a gear 28 on the propeller shaft 12. Thus both propellers may be driven either through the power transmitters from the main turbines alone or through gearing from the two cruising turbines alone. This cruising turbine 26 has its supply conduit 29 and exhaust conduit 30 corresponding to the supply conduit 24 and exhaust conduit 25, of the cruising turbine 18. Thus in normal full speed forward operation, the two cruising turbines may be thrown into operation, and the exhaust from each cruising turbine delivered to the main turbine of the other propeller. Of course if desired, the exhausts from both cruising turbines may be sent direct to the condenser or condensers and the two main turbines permitted to stand still. If desired, one of the cruising turbines, for instance the turbine 18 may be designed for forward drive and the other cruising turbine, that is the turbine 26, may be designed for backward or rearward drive, thus for going at slow speed ahead the turbine 18 and the turbine 10 may drive the two propellers while for backing at low speed the turbine 26 and the turbine 11 may be employed, the direction of flow of fluid in the power transmitter 15 being shifted so as to drive the propeller shaft 13 in the direction opposite to the rotation of the turbine 11. For backing, it is of course evident that the cruising turbines need not be employed, and that only the main turbines are necessary if both the hydraulic power transmitters are shifted for reversed rotation.

In the arrangement shown in Fig. 3, I provide the same turbines and the same arrangement of gearing, power transmitters, and shafts as in Fig. 2, but a modified form of piping arrangement as illustrated, so as to secure a somewhat different operation of the power plant. The cruising turbine 26, as here shown, is arranged to take the exhaust steam from the other cruising turbine 18 by a conduit 31. High pressure steam may be delivered through the conduits 20 and 22, to the two main turbines or high pressure steam may be delivered through the conduit 24 to the turbine 18, whose exhaust goes to the turbine 26. The exhaust from the turbine 26 may go through a conduit 32 to an auxiliary condenser, or it may be delivered through a conduit 33 to the inlets of the two main turbines. The exhaust from the main turbine 11 may be delivered through a conduit 34 to the inlet of the other main turbine 10, thus the two main turbines may be operated alone, and both on high pressure steam or may be operated alone, one as a low pressure turbine taking the exhaust from the other main turbine. At cruising speed, the two main turbines may work in parallel on the exhaust from the second cruising turbine 26 or may be stopped, and the exhaust delivered from the turbine 26 to the condenser. At high speed, the two main turbines may work on the steam either in parallel or series. For going backward, the cruising turbines may be thrown out, and the hydraulic power transmitters reversed so that only the main turbines are in operation. For going backward, one cruising turbine may drive in the reversed direction to that of the other as described in connection with Fig. 2. I may, if desired, place the gears between the hydraulic power transmitters and the main turbines, and with this arrangement, the cruising turbines may both drive forward and the direction of rotation reversed in the hydraulic power transmitters to back the ship.

For a three propeller ship, I may provide the plant shown in Fig. 4, which involves merely a duplication of parts, and it is not thought necessary to describe the various possible arrangement in detail.

The three cruising turbines 18, 26, and 35 are illustrated as connected in series in the steam circuit, and the three main turbines 10, 11, and 36 are also illustrated as being arranged in series in the same steam circuit. The necessary piping may be provided for operating them in parallel, or in part parallel and part series as described in connection with Figs. 2 and 3. For cruising, the main turbines may remain at rest or may operate on the exhaust steam from the cruising turbines and for backing the cruising turbines may be used, alone or in connection with the main turbines or the main turbines may be used alone.

Having thus described my invention, I claim as new and desire to secure by Letters Patent:

1. A power plant including two driven members, two main turbines, two hydraulic power transmitters each serving to transmit power from a turbine to its corresponding driven member, an auxiliary turbine, means for transmitting the power from said last mentioned turbine to one driven member and means for delivering the exhaust from said last mentioned turbine to the main turbine of the other shaft.

2. A power plant for ships including a plurality of propellers, a corresponding number of main turbines, a plurality of hydraulic power transmitters each serving to transmit power from a turbine to its corresponding propeller, an auxiliary turbine, means for transmitting the power from said last mentioned turbine to one propeller and means for delivering the exhaust from said last mentioned turbine to the main turbine of the other shaft.

3. A power plant for ships, including a plurality of propellers, a corresponding number of independently operable main turbines, a corresponding number of hydraulic power transmitters each being disposed between a turbine and its corresponding propeller, an auxiliary turbine, and detachable driving connections for transmitting the power from said last mentioned turbine to one of said propellers.

4. A power plant for ships, including two propellers, two main turbines, and two hydraulic power transmitters each serving to transmit power from a turbine to its corresponding propeller, an auxiliary turbine, and detachable power connections for said last mentioned turbine whereby one of said propellers may be driven by either its main turbine or by said auxiliary turbine, or both.

5. A power plant including two driven members, two main turbines, each delivering its power to the corresponding driven member, an auxiliary turbine, and detachable power connections for operatively connecting said last mentioned turbine to drive one of said driven members.

6. A power plant having a plurality of driven members, said power plant comprising a plurality of main turbines, each delivering its power to the corresponding driven member, an auxiliary turbine, and driving connections for operatively connecting said last mentioned turbine and one of said driven members and means for delivering the exhaust from said last mentioned turbine to one of said main turbines.

7. A power plant for ships, including a plurality of units each including a main turbine, a propeller, a hydraulic power transmitting connection between the two, an auxiliary turbine, and gearing between said auxiliary turbine and the propeller of the same unit, and means for delivering the exhaust steam from the auxiliary turbine of one unit to the main turbine of another unit.

8. A power plant for ships, including two units, each including a propeller, a main turbine therefor, a hydraulic power transmitter between the main turbine and said propeller, an auxiliary turbine and driving connections between said auxiliary turbine and said propeller, the auxiliary turbine of one unit being adapted for forward drive and the auxiliary turbine of the other unit being designed for backward drive.

9. A power plant for ships, including two units, each including a propeller, a main turbine therefor, an auxiliary turbine and driving connections between said auxiliary turbine and said propeller, the auxiliary turbine of one unit being adapted for forward drive and the auxiliary turbine of the other unit being designed for backward drive.

10. A turbine plant including in combination, a high pressure high speed turbine, a low pressure, low speed turbine, mounted for independent rotation, a driven shaft mechanical gearing for transmitting power from said high pressure turbine to said shaft, a hydraulic power transmitter for delivering power from said low pressure turbine to said shaft, a third turbine, having a separate driven shaft, and a hydraulic power transmitter therebetween, and means for delivering the exhaust from one of the two first mentioned turbines to said last mentioned turbines.

11. A turbine plant including two main turbines, two separate propellers, hydraulic power transmitters, between each main turbine and its propeller, two auxiliary turbines, mechanical gearing for transmitting power from said last mentioned turbines to said propellers, means for delivering steam to said last mentioned turbines in series, and means for delivering the exhaust from the last of said last mentioned turbines to one or both of said first mentioned turbines.

12. A turbine plant including two main turbines, two separate driven members, hydraulic power transmitters between each main turbine and its driven member, a third turbine, mechanical gearing for transmitting power from said last mentioned turbine to one of said driven members and means for delivering the exhaust from said last mentioned turbine to one or both of said first mentioned turbines.

13. A power plant for ships, including two units, each including a propeller, a main turbine therefor, an auxiliary turbine and normally disengaged driving connections between said auxiliary turbine and said propeller, the auxiliary turbine of one unit being adapted for forward drive and the auxiliary turbine of the other unit being designed for backward drive.

14. A turbine plant including two main turbines, two separate driven members, hydraulic power transmitters between each main turbine and its driven member, two auxiliary turbines, normally disengaged mechanical gearing for transmitting power from said last mentioned turbines to said driven members, means for delivering steam to said last mentioned turbines in series, and means for delivering the exhaust from the last of said last mentioned turbines to both of said first mentioned turbines.

Signed at Hamburg, Germany, this 9th day of June A. D. 1914.

HEINRICH ADAM BÖHM.

Witnesses:
 ERNEST H. L. MUMMENHOFF,
 CHARLES H. HALLEY.

Copies of this patent may be obtained for five cents each, by addressing the "Commissioner of Patents, Washington, D. C."